US005917921A

United States Patent [19]

Sasaki et al.

[11] Patent Number: 5,917,921

[45] **Date of Patent: *Jun. 29, 1999**

[54] NOISE REDUCING MICROPHONE APPARATUS

[75] Inventors: Tooru Sasaki, Tokyo; Masashi Ohkubo, Kanagawa, both of Japan

[73] Assignee: Sony Corporation, Tokyo, Japan

[ * ] Notice: This patent is subject to a terminal disclaimer.

[21] Appl. No.: 08/424,581

[22] Filed: Apr. 17, 1995

Related U.S. Application Data

[63] Continuation of application No. 07/984,405, Dec. 2, 1992, abandoned.

[30] Foreign Application Priority Data

Dec. 6, 1991 [JP] Japan .................................... 3-349274

[51] Int. Cl.$^6$ .................................................... H04B 15/00

[52] U.S. Cl. ............................................... 381/94; 381/92

[58] Field of Search ................................ 381/94, 92, 71, 381/68, 68.2, 68.4

[56] References Cited

U.S. PATENT DOCUMENTS

| | | | |
|---|---|---|---|
| 3,803,357 | 4/1974 | Sacks | 381/94 |
| 4,427,845 | 1/1984 | Yoshida | 381/94 |
| 4,658,256 | 4/1987 | Piele | 342/383 |
| 4,912,387 | 3/1990 | Moulds, III | 318/629 |
| 4,956,867 | 9/1990 | Zurek et al. | 381/94.1 |

FOREIGN PATENT DOCUMENTS

| | | |
|---|---|---|
| 430513 | 5/1991 | European Pat. Off. . |
| 452103 | 6/1991 | European Pat. Off. . |

OTHER PUBLICATIONS

Patent Abstracts of Japan, vol. 14, No. 569, Dec. 18, 1990 (Aisin Seiki).

*Primary Examiner*—Curtis Kuntz
*Assistant Examiner*—Ping W Lee
*Attorney, Agent, or Firm*—Jay H. Maioli

[57] ABSTRACT

A noise reducing microphone apparatus having an adaptive noise canceller which has a primary input and a reference input and in which the reference input is subtracted from the primary input through an adaptive filter and the adaptive filter is adaptively controlled by an output signal resulted from the subtraction, comprises. The apparatus includes a pair of microphone units disposed in proximate locations; and subtracting means for performing subtraction of outputs from the pair of microphone units. An output from one of the microphone units is supplied as the primary input of the adaptive noise canceller. A differential output from the subtracting means is supplied as the reference input of the adaptive noise canceller.

3 Claims, 8 Drawing Sheets

NOISE REDUCING MICROPHONE APPARATUS

This is a continuation of application Ser. No. 07/984,405 filed Dec. 2, 1992 now abandoned.

BACKGROUND OF THE INVENTION

1. Field of the Invention

This invention relates to a noise reducing microphone apparatus and, in particular, to such an apparatus for reducing noise components in microphone outputs.

2. Description of the Prior Art

Most of microphones are configured to convert changes in sound pressure of an acoustic wave to mechanical vibration of a diaphragm and to activate an electro-acoustic transducer system on the basis of the vibration. Therefore, if a factor affects the diaphragm when sound is picked up by the microphone, a noise is produced.

If the factor is wind, a noise by wind (hereafter referred to as a wind noise) is produced, and if the factor is vibration, a noise by vibration (hereafter referred to as a vibration noise) is produced.

There are, for example, the following existing techniques for reducing a wind noise:

(1) the use of a windscreen (2) the use of an electro-acoustic high pass filter (3) the use of an arrangement exploiting a non-directional property in low sound ranges There are, for example, the following existing techniques for reducing a vibration noise:

(1) the use of a vibration isolating mechanism (2) the use of a non-directional microphone element (3) an analog noise-canceling method The above-mentioned existing techniques for reducing a wind noise involve the following problems:

(1) In the case where a windscreen is used, in general, as the outer dimension of the windscreen increases and as the distance between the microphone and the inner wall of the windscreen increases, a wind noise decreases. However, the size of the microphone apparatus increases.

(2) Since a wind noise mainly consists of low band components, it is certainly effective for reducing the wind noise by using a high pass filter. However, since low band components of the sound itself are also cut in addition to the wind noise, the sound pickup quality is decreased.

(3) With a non-directional microphone, in comparison with a directional microphone, the level of a wind noise decreases more. Practically, however, because of the effect of a casing surrounding the microphone, the noise is not decreased to a sufficiently low level by employing an "arrangement exploiting a non-directional property in low sound ranges".

Therefore, under the present circumstances where both smaller dimension of a microphone and higher sound pickup quality of the microphone are desired, more reduction of a wind noise is difficult with only the existing techniques. This also applies to a vibration noise.

On the other hand, as a technique for eliminating a noise incorporated into a signal, adaptive noise cancelling is known (B. Widrow et al. "Adaptive noise cancelling: principles and applications" Proc. IEEE, vol. 63, no. 12, pp. 1692–1716, Dec. 1975.).

According to the technique, it is necessary to supply noise components which are strongly correlated with a noise to be eliminated as a reference input signal. However, it is very difficult in a small apparatus to supply only noises such as a wind noise as a reference input which is received from the same direction as necessary sounds.

OBJECTS AND SUMMARY OF THE INVENTION

It is therefore an object of the invention to provide a noise reducing microphone apparatus that can be small-scaled and can reliably eliminate a wind noise, a vibration noise, and so on.

According to an aspect of the invention, there is provided a noise reducing microphone apparatus having an adaptive noise canceller which has a primary input and a reference input and in which the reference input signal is subtracted from the primary input through an adaptive filter and the adaptive filter is adaptively controlled by an output signal resulted from the subtraction, comprising:

a pair of microphone units disposed in proximate locations; and subtracting means for performing subtractions of outputs from the pair of microphone units, wherein an output from one of the microphone units is supplied as the primary input signal of the adaptive noise canceller and a differential output from the pair of microphone units is supplied as the reference input signal of the adaptive noise canceller.

Outputs from a pair of microphones disposed in proximate locations originally include an audio signal component and a noise component (for example, noise component caused by wind). These outputs from the microphones undergo subtraction. As a result, the output from one of the microphones includes the audio signal component and the noise component and a differential output from the pair of the microphones include only a noise component. The output including the audio component and the noise component is used as the primary input while the differential output including only the noise component is used as the reference input.

The reference input is adaptively processed to equalize with the noise component in the primary input. The adaptively processed reference input is subtracted from the primary input. As a result, only the noise component is canceled from the primary input, and the audio signal component is output in the original form.

The above, and other, objects, features and advantages of the present invention will become readily apparent from the following detailed description thereof which is to be read in connection with the accompanying drawings.

DETAILED DESCRIPTION OF THE PREFERRED EMBODIMENTS

Embodiments of the invention are explained below with reference to FIGS. 1 to 10.

FIGS. 1 to 8 are views illustrating an embodiment of the invention.

Figure 3:
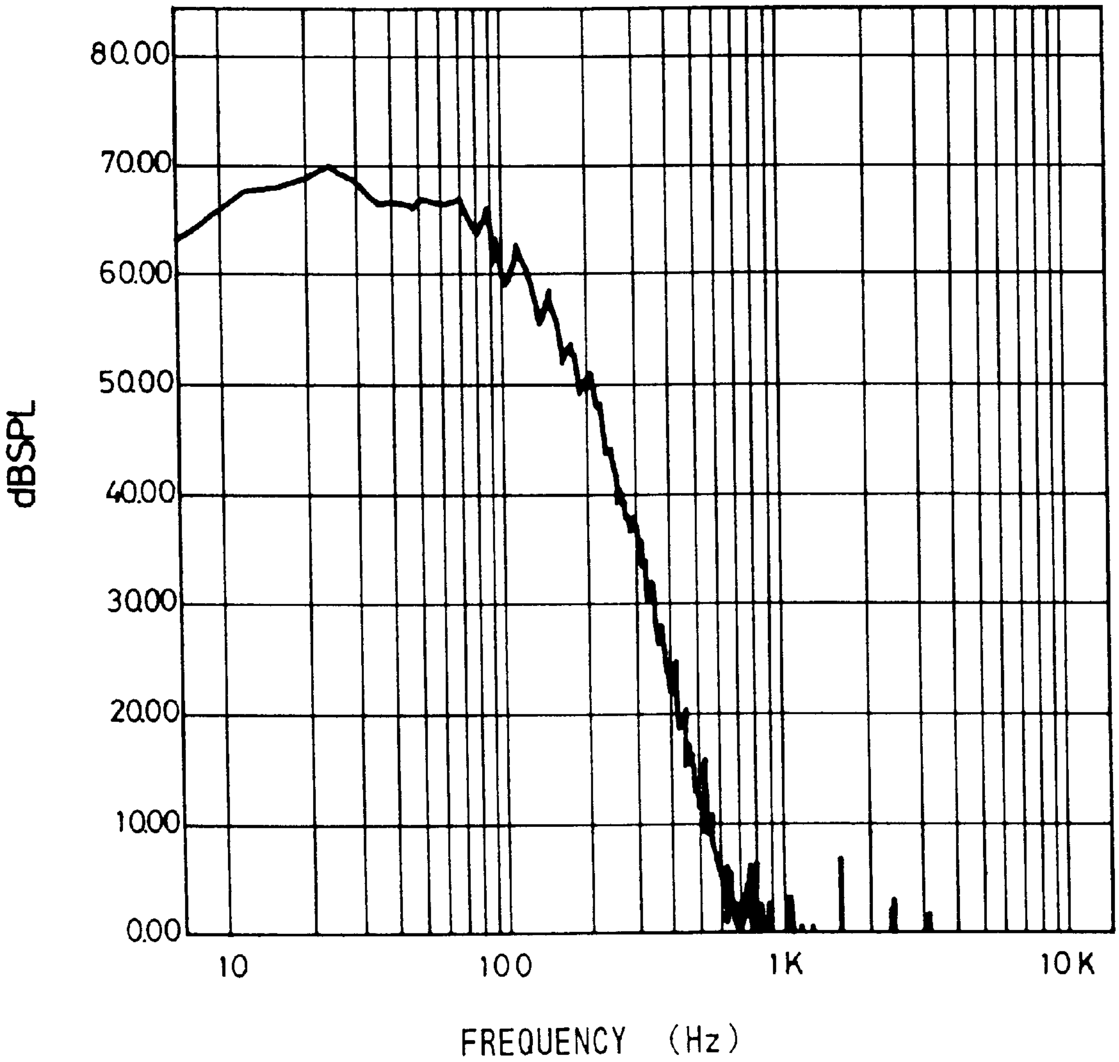
FIG. 3 is a diagram showing the frequency spectrum of a wind noise component.

A pair of microphones 1 and 2 disposed in close locations detect ambient sound together with a wind noise, and output it in the form of an electrical signal. Since the microphones 1 and 2 are disposed in close locations, the same sound and wind noise are detected, and they are output in the form of electrical signals. FIG. 3 shows an example of a frequency spectrum of a wind noise component included in the outputs from the microphones 1 and 2. It is known from FIG. 3 that the wind noise mainly consists of low band components.

The microphones 1 and 2 may be oriented in the same direction or, alternatively, they may be oriented in the opposite directions if the distance between the microphones 1 and 2 is within the wavelength defined by the frequency of a desired signal. An electrical signal output from the microphone 1 is supplied to an A/D converter 3 while an electrical signal output from the microphone 2 is supplied to an A/D converter 4.

The A/D converters 3 and 4 convert the electrical signals supplied from the microphones 1 and 2 to digital signals. The digital signal converted by the A/D converter 3 is used as a primary input expressed by (S+n). The digital signal converted by the A/D converter 4 is expressed by (S+(n*)). In the digital signals, S represents the audio signal component while n and (n*) represents the wind noise component. The noise component n has an additive property while the noise component (n*) is correlative with the noise component n in the primary input (S+n).

The primary input (S+n) is supplied to a delay circuit 7 provided in an adaptive noise canceler 6. The primary input (S+n) is also supplied to an adder 5. In addition, an output of the A/D converter 4 is supplied to the adder 5.

The adder 5 adds the primary input (S+n) to the output of the A/D converter 4 attached with a negative sign, that is, [−(S+(n*))]. Since the audio signal components S have sufficiently long wavelengths, they have substantially the same phase in the near place. Therefore, the audio signal components S are eliminated by executing subtraction. Accordingly, a reference input expressed by (n−(n*)) is created.

Explained below is creation of the reference input (n−(n*)).

Figure 4:
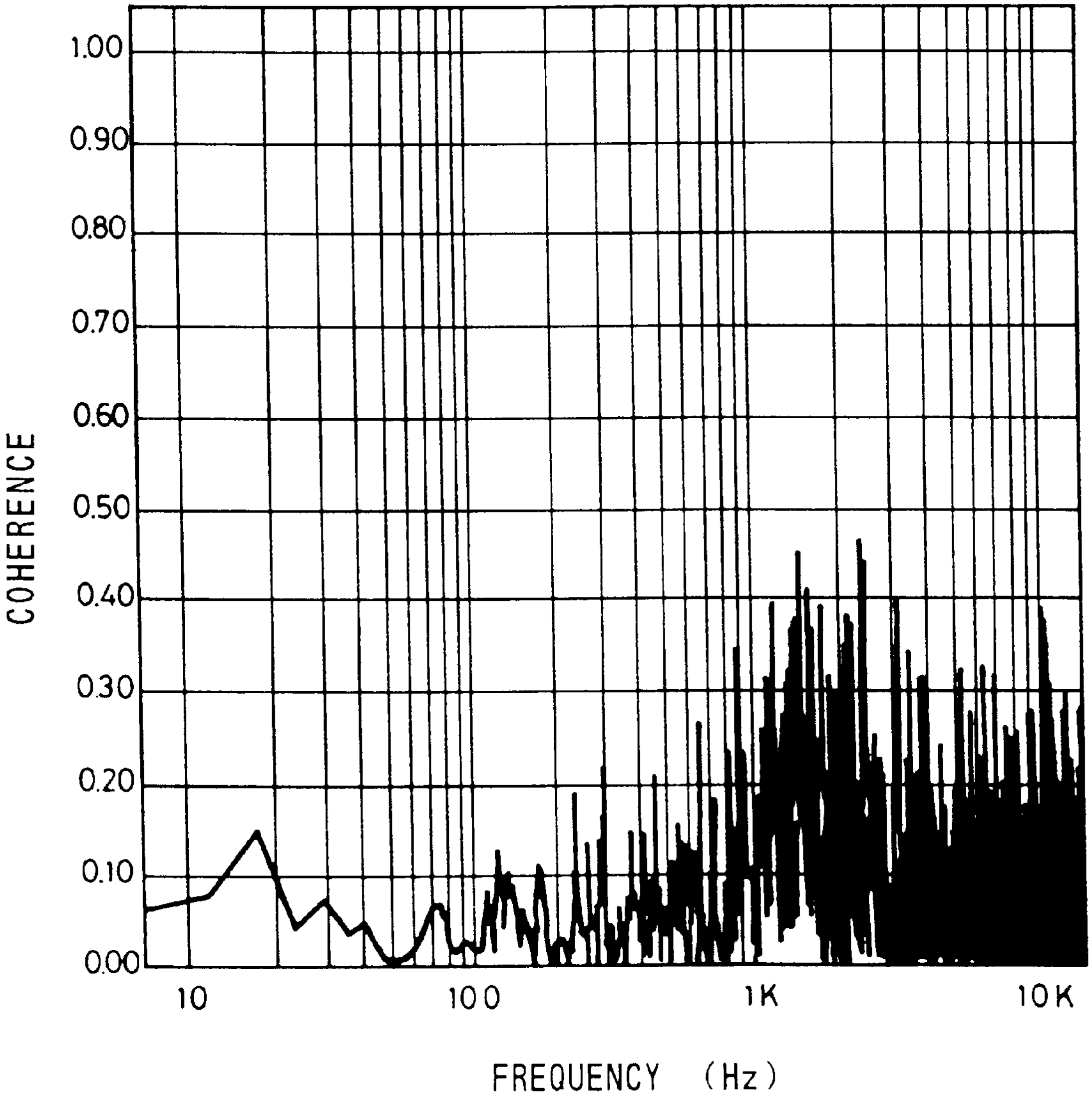
FIG. 4 is a diagram showing the rate of correlation of wind noise components picked up by a pair of microphones.
Figure 5:
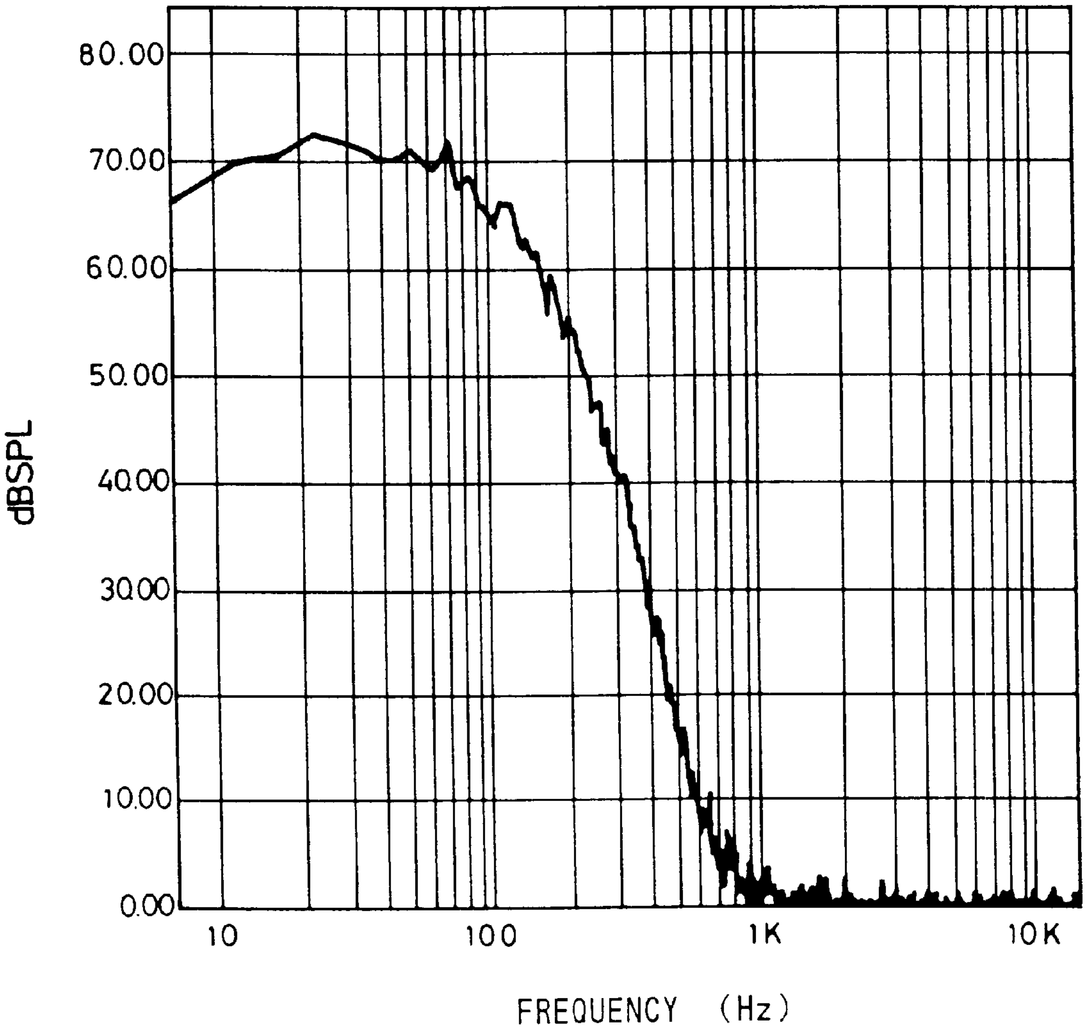
FIG. 5 is a diagram showing an example of a differential output of the wind noise components picked up by the pair of microphones.

FIG. 4 shows an example of coherence of the wind noise component generated in the pair of microphones 1 and 2. It has been known, as shown in FIG. 4, that, in general, wind noise components produced in two acoustic terminals represent a low correlation even if the terminals are proximately located. Therefore, a difference between outputs from the microphones 1 and 2 does not become zero, and creation of the reference input (n−(n*)) is possible. FIG. 5 shows a frequency spectrum of the reference input (n−(n*)). The reference input (n−(n*)) is supplied to an adaptive filter 9 in the adaptive noise canceler 6.

The delay circuit 7 in the adaptive noise canceler 6 outputs the primary input (S+n) after a delay of a predetermined time. The amount of the delay is equivalent to a time delay required for computation for adaptive processing or to a time delay in the adaptive filter 9, and so on, and can be set adequately in accordance with the arrangement of a system. The primary input (S+n) which has passed the delay circuit 7 is supplied to an adder 8.

The adder 8 executes addition of the output from the delay circuit 7 and a signal Y attached with a negative sign and output from the adaptive filter 9 which will be described later. The signal Y, as explained later, is a component analogous to the noise component n in the primary input (S+n). Therefore, the signal Y, which is a component analogous to the noise component n, is subtracted from the primary input (S+n) by the adder 8, and the audio signal component S remains. In other words, the noise component n in the primary input (S+n) is minimized.

The audio signal component S is supplied to a D/A converter 10 and also fed back to the adaptive filter 9. The audio signal component S expressed in the form of a digital signal is converted to an analog signal by the D/A converter 10, and it is taken out from a terminal 11.

Figure 6:
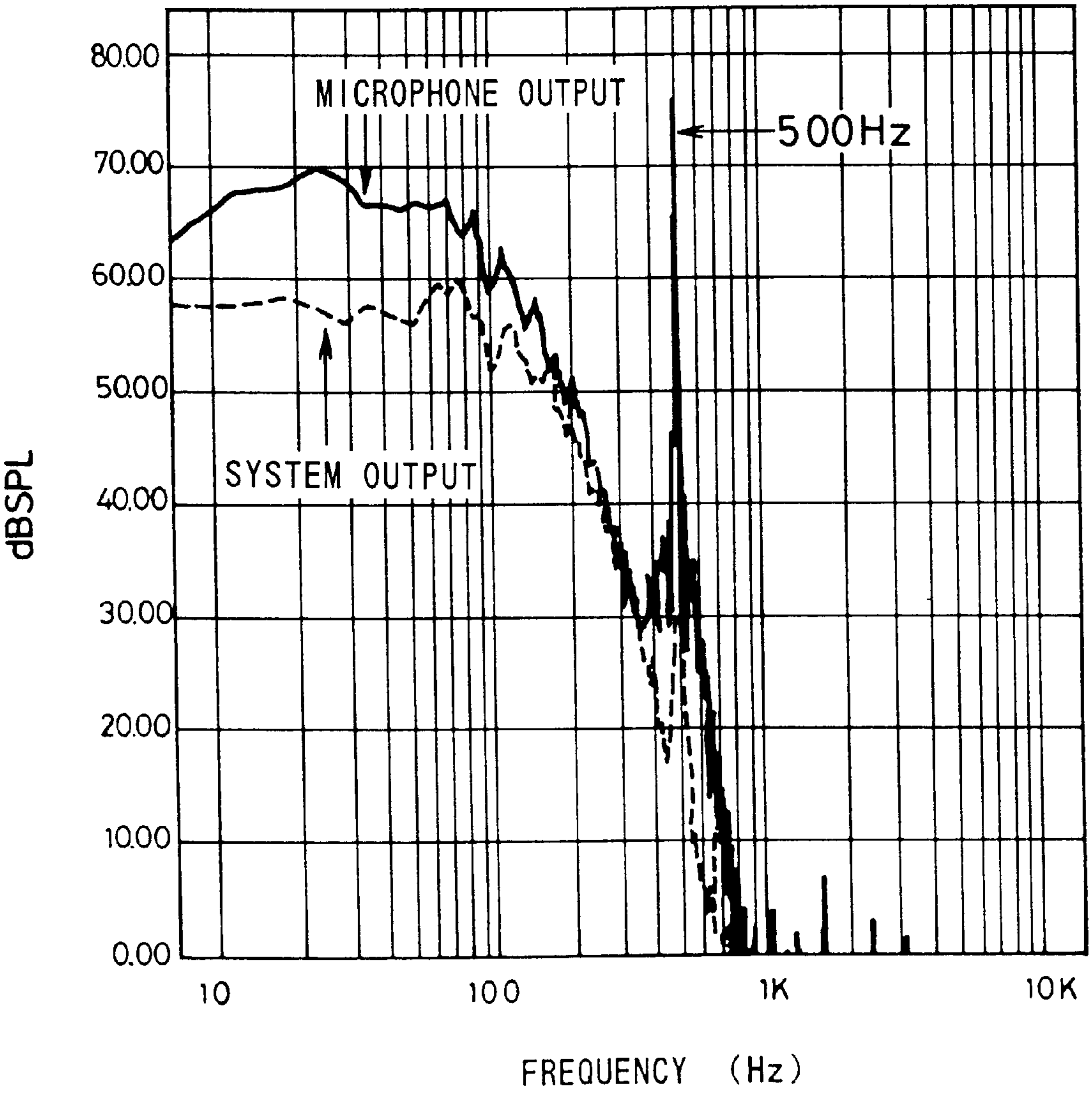
FIG. 6 is a waveform diagram showing the noise reducing effects.

FIG. 6 shows a result of noise reduction by the foregoing embodiment. FIG. 6 illustrates the main input (S+n), that is, the output from the microphone 1, shown by a solid line, and a system output, that is, the output from the adaptive noise canceler 6, by a broken line. A sine wave of 500 Hz which is a pseudo representation of the audio signal component S is added.

It is known from FIG. 6 that the decrease of the level of the signal (broken line in FIG. 6), which is the output from the adaptive noise canceler 6, is remarkable as compared with the level of the noise component n (solid line in FIG. 6) in the output from the microphone 1. It is also known that the sine wave of 500 Hz maintains its level regardless of the presence or absence of the adaptive noise canceler 6.

Explained below is operation of the adaptive filter 9 of the adaptive noise canceler 6.

The adaptive filter 9 creates the signal Y as a component analogous to the noise component n in the primary input (S+n). That is, its filtering characteristic is automatically adjusted from time to time so that the output from the adaptive noise canceler 6 resembles the audio signal component S in the primary input (S+n).

Figure 1:
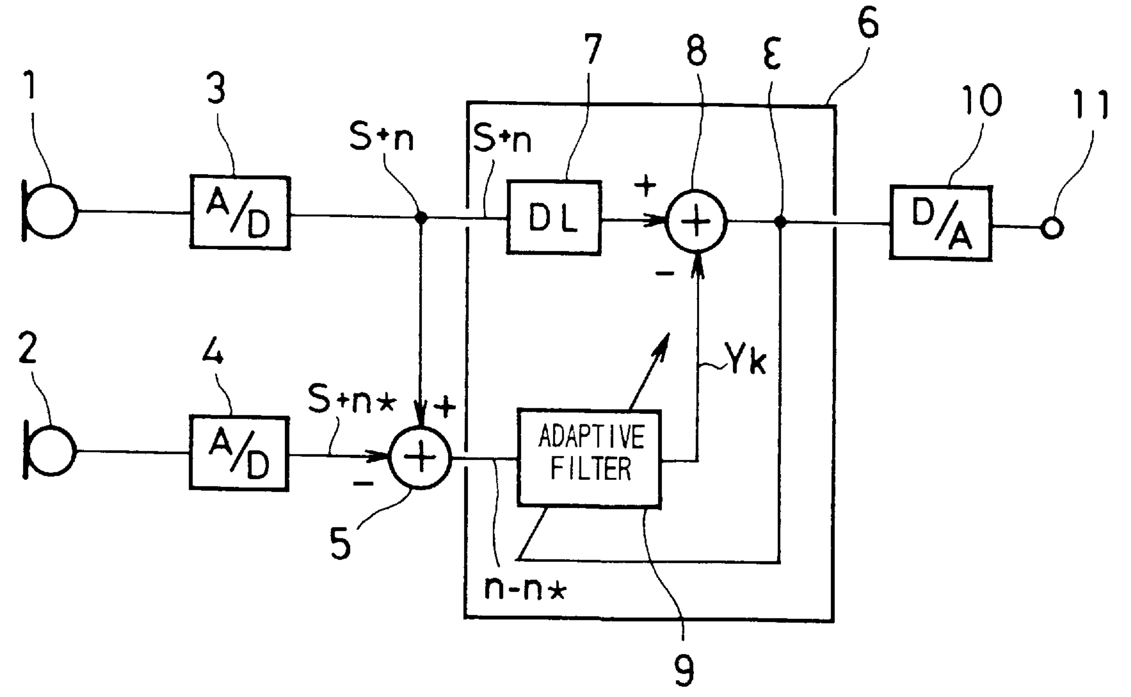
FIG. 1 is a block diagram of an embodiment of the invention.
Figure 2:
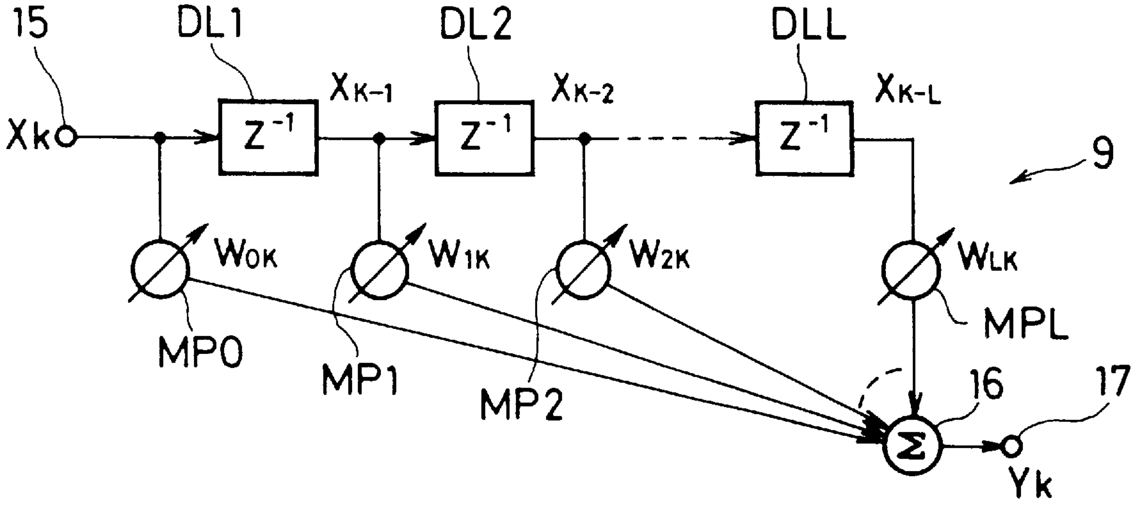
FIG. 2 is a block diagram of an arrangement of an adaptive filter.

An adaptive linear coupler of an FIR filter type shown in FIG. 2 is used as the adaptive filter 9. In the construction of FIG. 2, DL1 to DLL denote delay circuits, and MP1 to MPL denote coefficient multipliers. Reference numeral 16 refers to an adder, and 15 and 17 to input/output terminals.

$[Z^{-1}]$ in the delay circuits DL1 to DLL represents a delay of a unit sampling time, and $W_{nk}$ supplied to the coefficient multipliers MP1 to MPL represents a weighting coefficient. If the weighting coefficient $W_{nk}$ is fixed, the filter behaves as a normal FIR digital filter.

Explained below is an algorithm for adaptively activating the adaptive filter 9. Although various algorithms may be used for computation in the adaptive filter 9, the following explanation is directed to LMS (least mean square), which is practical and often used because of a relatively less amount of computation:

If an input vector $X_k$ is expressed by:

$$X_k=[X_k\ X_{k-1}\ X_{k-2}\ \ldots\ X_{k-L}]$$

an output $Y_k$ from the adaptive filter 9 is given by:

$$Y_k = \sum_{n=0}^{L} W_{nk} K_{k-n}$$

Let an output from the delay circuit 7 be $d_k$, then its differential output [residual output] is:

$$\epsilon_k = d_k - X_k^T W_k$$

By the LMS (least mean square) method, renewal of the weighting vector $W_k$ is performed in accordance with the following equation:

$$W_{k+1} = W_k + 2\mu\epsilon_k X_k$$

$\mu$ in the foregoing equation is a gain factor determining the speed and stability of the adaptation, which is so called a step gain.

By renewing the weighting vector from time to time as explained above, the device behaves to minimize the output power of the system. This operation is explained below in a formulated manner. When the delay circuit 7 is disregarded for simplification, the differential output $\epsilon$ from the adder 8 is:

$$\epsilon = S + n - Y$$

An expected value of square of ($\epsilon$) is expressed by:

$$E[\epsilon^2] = E[S^2] + E[(n-Y)^2] + 2E[S(n-Y)]$$

Since S is not correlative with n and Y, in the above equation, $$E[S(n-Y)] = 0$$

Therefore, the expected value $E[\epsilon^2]$ of square of ($\epsilon$) is expressed by:

$$E[\epsilon^2] = E[S^2] + E[(n-Y)^2]$$

Although the adaptive filter 9 is adjusted to minimize $E[\epsilon^2]$, $E[S^2]$ is not affected. As a result, $$Emin[\epsilon^2] E[S^2] + E[(n-Y)^2]$$

Since $E[S^2]$ is not affected, minimization of $E[\epsilon^2]$ means minimization of $E[(n-Y)^2]$. Therefore, the output Y of the adaptive filter 9 is an optimum estimated value of least square of [n].

When $E[(n-Y)^2]$ is minimized, $E[(\epsilon-S)^2]$ is also minimized because [$\epsilon$−S=n−Y]. Therefore, minimization of the entire output power by adjusting the adaptive filter 9 is equivalent to making the differential output $\epsilon$ be an optimum estimated value of least square of the audio signal component S.

The differential output $\epsilon$, in general, includes a certain amount of noise component in addition to the audio signal component S. Since the noise component output is defined by (n−Y), minimization of $E[(\epsilon-Y)^2]$ is equivalent to maximization of signal-to-noise ratio of the output.

Figure 7:
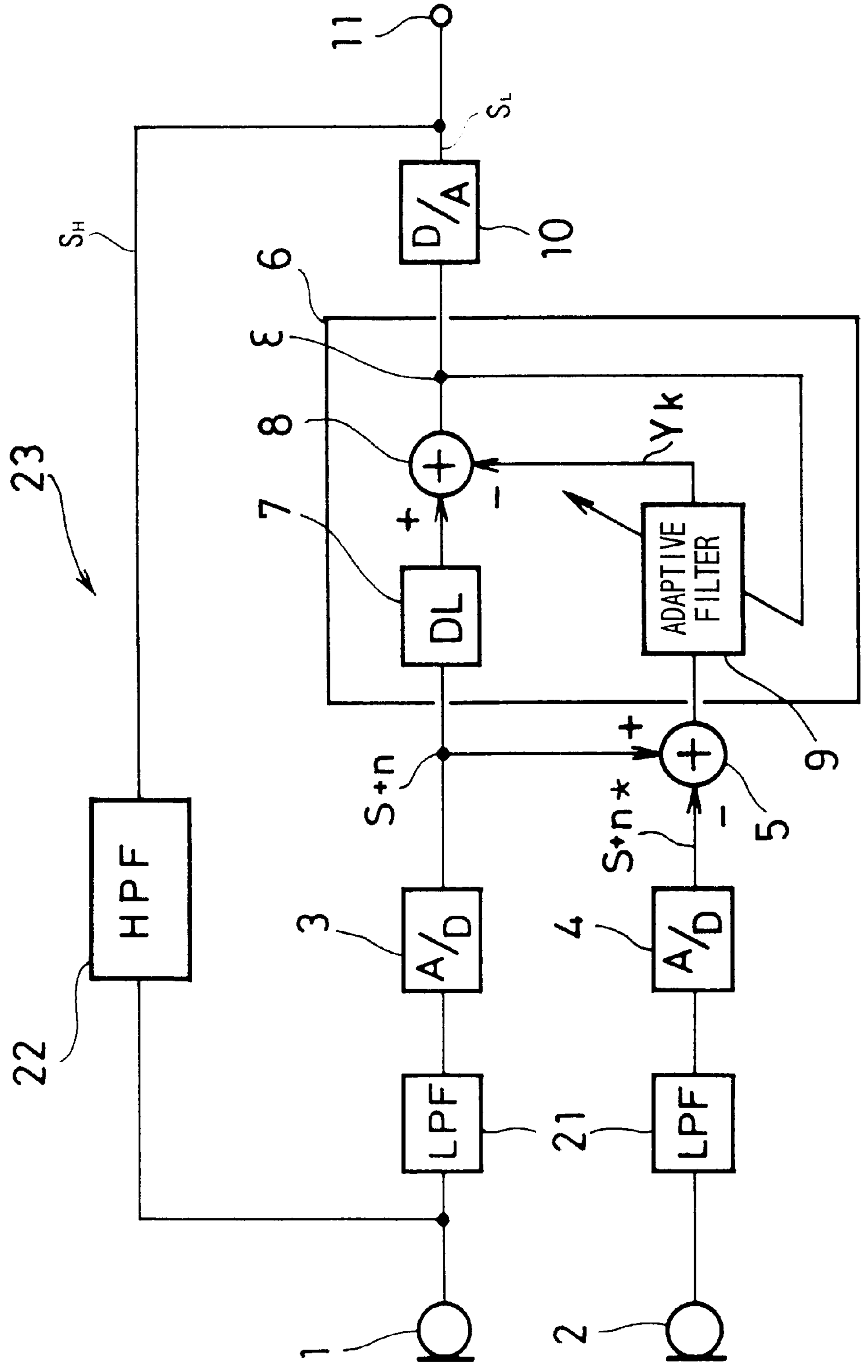
FIG. 7 is a block diagram showing a first modification of the embodiment.

FIG. 7 shows a first modification of the foregoing embodiment. The first modification is based on the frequency spectrum of a wind noise component being concentrated in low bands. Circuits elements common to those in the foregoing embodiment are labeled with the same reference numerals, and their redundant explanation is omitted.

The first modification is different from the foregoing embodiment in that a line 23 connecting the output of the microphone 1 to the terminal 11 is provided and that a high pass filter 22 is interposed in the line 23. Further, low pass filters 21 are interposed between the microphones 1, 2 and the A/D converters 3, 4, when necessary. The low pass filter 21 may be interposed between the terminal 11 and the D/A converter 10 in the output site of the system, and the other terminal of the line 23 may be coupled between the low pass filter 21 and the terminal 11.

This arrangement makes it possible to obtain an audio signal component S which is mixture of a low band audio signal component $S_L$, in which the wind noise component has been reduced by the adaptive noise canceler 6, and a high band audio signal component $S_H$, which is obtained from the microphone 1 through the high pass filter 22 and from which the wind noise component has been cut. The other arrangements, their operations and effects are equal to those of the foregoing embodiment, and their redundant explanation is omitted.

Figure 8:
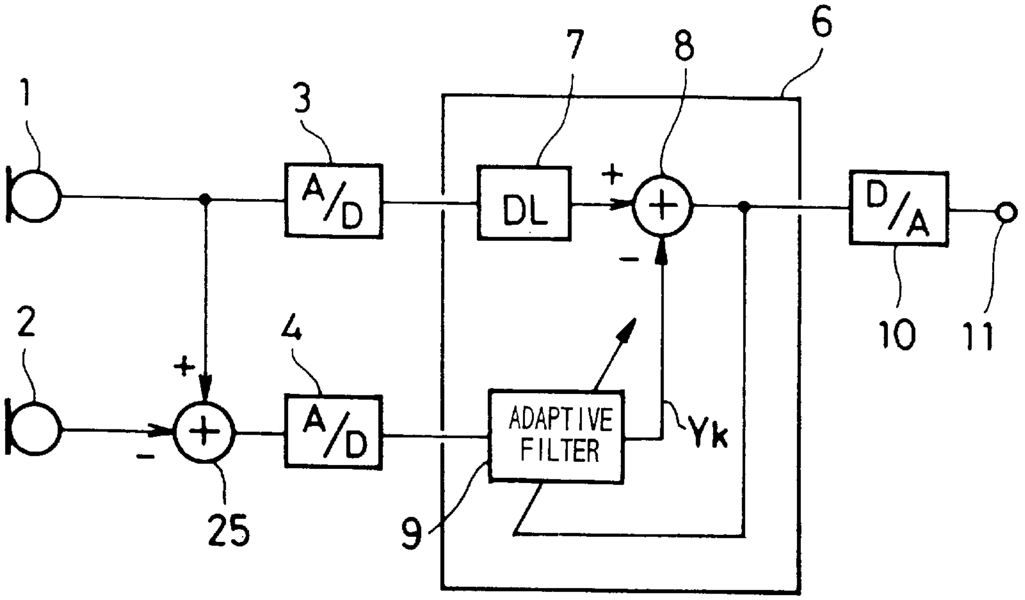
FIG. 8 is a block diagram of a second modification of the embodiment.

FIG. 8 shows a second modification of the foregoing embodiment. The second modification is different from the foregoing embodiment in that the adder 5 is replaced by an analog adder 25 and that the analog adder 25 is located between the microphones 1, 2 and the A/D converters 3, 4. That is, a reference input is in an analog form. The other arrangements, their operations and effects are equal to those of the foregoing embodiment. Elements common to the foregoing embodiment are therefore labeled with the same reference numerals, and their redundant explanation is omitted.

According to the embodiment, the primary input (S+n) and the reference input (n−(n*)) are created on the basis of the outputs from the pair of microphones 1 and 2 disposed in close locations. In the adaptive filter 9, the signal Y analogous to the noise component n in the primary input (S+n) is created on the basis of the reference input (n−(n*)). By subtracting the signal Y from the primary input (S+n) by the adder 8, the noise component n is canceled, and the audio signal component S is output.

Therefore, by using a pair of normal microphones 1 and 2, a wind noise component can be canceled without using a windscreen. In addition, since the microphones 1 and 2 are disposed in close locations, the embodiment contributes to scale reduction of the apparatus. In regard of cancellation of a wind noise component, since no electroacoustic high pass filter is required, deterioration of the sound pickup quality is prevented.

Moreover, since the adaptive noise canceler 6 is used, the characteristic of the adaptive filter 9 is automatically renewed, regardless of changes in the wind noise characteristic (for example, level or spectral distribution, and so on), and the wind noise component can be reduced in a stable manner.

Figure 9:
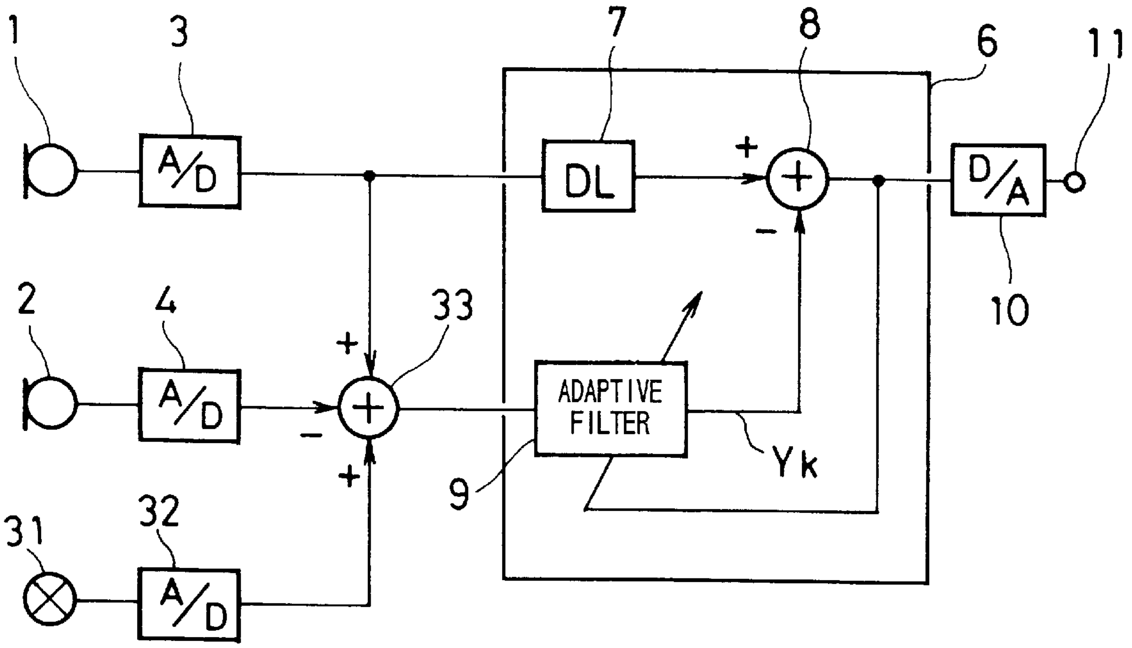
FIG. 9 is a block diagram of another embodiment of the invention.
Figure 10:
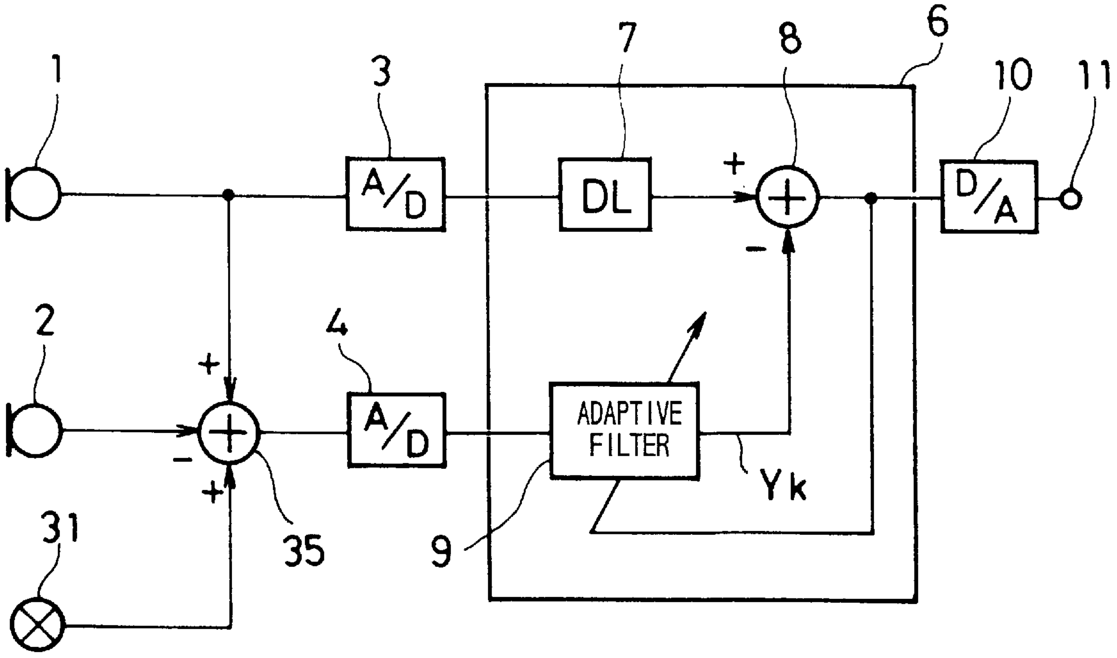
FIG. 10 is a block diagram of a modification of another embodiment.

FIGS. 9 and 10 show another embodiment. The embodiment is different from the foregoing embodiment in that not only a wind noise but also a vibration noise caused by vibrations are taken into consideration. That is, as shown in FIG. 9, there are provided a vibration sensor 31 for detecting vibrations and an A/D converter 32 for converting an analog output from the vibration sensor 31 into a digital signal. The adder 5 shown in the foregoing embodiment is replaced by an adder 33 which can perform addition and subtraction of three inputs. Elements common to those of the foregoing embodiment are labeled with the same reference numerals, and their redundant explanation is omitted.

Outputs from the microphones 1 and 2 respectively include an audio signal component S and a noise component including a wind noise and a vibration noise.

An electrical signal output from the microphone 1 is supplied to the A/D converter 3 and converted into a digital signal by the A/D converter 3. As a result, a primary input is created. The primary input is supplied to the delay circuit 7 in the adaptive noise canceler 6. The primary input is also supplied to the adder 33.

An electrical signal output from the microphone 2 is supplied to the A/D converter 4 and converted into a digital signal by the A/D converter 4. The digital signal is supplied to the adder 33.

A vibration component detected by the vibration sensor 31 is converted into a digital signal by the A/D converter 32. The digital signal is supplied to the adder 33.

The adder 33 adds outputs from the A/D converters 3 and 32 to the output from the A/D converter 4 attached with a negative sign. As a result of the addition and subtraction, the audio signal component S is eliminated, and a noise component consisting of the wind noise and the vibration noise is created for use as a reference input. After this, a signal Y is created on the basis of the reference input. The signal Y is subtracted from the primary input by the adder 8, which results in canceling the noise component consisting of the wind noise and the vibration noise, and the audio signal component S is output.

Excepting that the noise component consists of the wind noise and the vibration noise and that both the wind noise and the vibration noise can be canceled, the other arrangements, their operations and effects of another embodiment are equal to those of the foregoing embodiment, and their redundant explanation is omitted.

FIG. 10 shows a modification of another embodiment. This modification is different from another embodiment in that the adder 33 is replaced by an analog adder 35 and that the analog adder 35 is located between the microphone 2 and the A/D converter 4.

Since the other arrangements, their operations and effects are equal to those of another embodiment and the second modification of the foregoing embodiment, common elements are labeled with the same reference numerals, and their redundant explanation is omitted. Although not illustrated, the same arrangements as those of the first modification of the foregoing embodiment may be employed in another embodiment.

Another embodiment has, in addition to those of the foregoing embodiment, the arrangement in which vibrations are detected by the vibration sensor 31, and the vibration component detected by the vibration sensor 31 is supplied to the adder 33. Therefore, the reference input consisting of the wind noise and vibration noise is created. On the basis of the reference input, the adaptive filter 9 creates the signal Y analogous to the noise component in the primary input. When the signal Y is subtracted from the primary input by the adder 8, the noise component is canceled, and the audio signal component S is output.

Therefore, in addition to the effects of the foregoing embodiment, another embodiment can cancel the vibration noise component, and can realize an excellent sound pickup quality with a single processing system without preparing different processing systems for different kinds of noises.

Another embodiment has been explained as being directed to a noise component consisting of a wind noise and a vibration noise. However, it is not limited to this, but may target only a vibration noise.

The noise reducing device shown in any of the embodiments is applicable to various kinds of recording systems. For example, it is applicable to a small-scaled portable video camera apparatus to detect and eliminate vibrations caused by a user, vibrations caused by mechanical systems, and so on, in addition to a wind noise. Further, the pair of microphones 1 and 2 used in the embodiments may be either directional or non-directional.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

The noise reducing microphone apparatus according to the invention has the effect that a wind noise component can be cancelled without using a windscreen. Close positional relationship between the pair of microphones contributes to scale reduction of the apparatus. Because of no electro-acoustic high pass filter or the like being required, deterioration of the sound pickup quality is prevented.

Further, the use of the adaptive noise canceler gives the effect that the characteristic of the adaptive filter is automatically renewed, regardless of a change in the nature of a wind noise (for example, level or spectral distribution, etc.), and the wind noise component is stably reduced.

In addition, a vibration noise component can be canceled. Further, an excellent sound pickup quality can be realized with a single processing system without using different processing systems for different kinds of noises.

What is claimed is:

1. A noise reducing microphone apparatus for reducing effects of wind noise on desired sounds comprising:

an adaptive noise canceller which has a primary input signal representing the desired sounds and the wind noise and a reference input signal representing only the wind noise and in which the reference input signal is passed through an adaptive filter and subtracted from the primary input signal and the adaptive filter is adaptively controlled by an output signal resulting from the subtraction;

a pair of microphone units disposed in close proximity to each other and each receiving the desired sounds and the wind noise, the output of one of the microphone units being supplied as the primary input signal to the adaptive noise canceller;

a single vibration detector for generating a vibration signal proportional to vibration affecting the pair of microphone units; and adding and subtracting means for performing subtraction of output signals from the pair of microphone units and performing addition of said vibration signal to a result of the subtraction and producing an output supplied as the reference input signal to the adaptive noise canceller, wherein an output from one of the microphone units is supplied as the primary input signal to said adaptive noise canceller and an output signal from the adding and subtracting means is supplied as the reference input signal to the adaptive noise canceler so that an output of the adaptive noise canceller has reduced wind noise effects.

2. The noise reducing microphone apparatus according to claim 1, further comprising:

a plurality of analog-to-digital converters receiving outputs respectively from the pair of microphone units and the vibration detecting means for producing digital outputs fed to the adaptive noise canceller and the adding and subtracting means; and a digital-to-analog converter receiving the output of the adaptive noise canceller and producing an analog output signal therefrom.

3. The noise reducing microphone apparatus according to claim 1, further comprising:

a first analog-to-digital converter receiving the output of the one microphone unit and producing a digital signal fed to the adaptive noise canceller as the primary input signal;

a second analog-to-digital converter receiving the output of the adding and subtracting means and producing a digital signal fed to the adaptive noise canceller as the reference input signal; and a digital-to-analog converter receiving the output of the adaptive noise canceller and producing an analog output signal therefrom.

* * * * *